United States Patent
Hane et al.

(10) Patent No.: US 6,903,830 B1
(45) Date of Patent: Jun. 7, 2005

(54) ELECTRONIC PRINTING APPARATUS WITH POWER SAVING MODE AND CONTROL METHOD THEREFOR

(75) Inventors: Kiyoji Hane, Nagano (JP); Eiji Takagi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/521,852

(22) Filed: Mar. 9, 2000

(30) Foreign Application Priority Data

Mar. 12, 1999 (JP) .......................................... 11-067155
Nov. 11, 1999 (JP) .......................................... 11-321734

(51) Int. Cl.[7] .......................... G06K 15/02; B41J 29/38
(52) U.S. Cl. ........................ 358/1.13; 347/5; 340/539.3
(58) Field of Search .......................... 358/1.1, 1.2, 1.3, 358/1.4, 1.5, 1.6, 1.7, 1.8, 1.9, 1.11, 1.12, 1.13, 1.14, 1.15, 1.16, 1.17, 1.18, 468, 113–117; 347/5; 713/321; 340/539.3; 399/38, 43

(56) References Cited

U.S. PATENT DOCUMENTS

| | | | |
|---|---|---|---|
| 5,714,975 A | * | 2/1998 | Spackman .................. 358/3.13 |
| 5,819,013 A | | 10/1998 | Miyazaki et al. ........... 395/114 |
| 5,937,148 A | * | 8/1999 | Okazawa .................... 358/1.13 |

FOREIGN PATENT DOCUMENTS

| | | | | |
|---|---|---|---|---|
| EP | 0 717 549 A2 | 6/1996 | ............ | H04N/1/00 |
| JP | 64-20185 | * 1/1989 | ............ | B41J/29/38 |
| JP | 7-156512 | 6/1995 | ............ | B41J/29/38 |
| JP | 8-101606 | 4/1996 | .......... | G03G/21/00 |
| JP | 8-137637 | 5/1996 | ............ | G06F/3/12 |

OTHER PUBLICATIONS

Patent Abstract of Japan, 08137637, May 31, 1996.
Patent Abstract of Japan, 08101606, Apr. 16, 1996.
Patent Abstract of Japan, 07156512, Jun. 20, 1995.

* cited by examiner

*Primary Examiner*—King Y. Poon
(74) *Attorney, Agent, or Firm*—Sughrue Mion, PLLC

(57) ABSTRACT

An electronic printing apparatus according to the present invention provides, for a print controller, a normal operating mode and a power saving mode for which less power is required. More preferably, when the print controller is set to the power saving mode, an interface circuit for accepting a printing interrupt is maintained in the normal state, and a CPU for controlling the printing sequence enters a power saving state. Then, the print controller, while in the power saving mode, can realize a constant savings in power, and can appropriately accept an interrupt, such as a print interrupt.

11 Claims, 4 Drawing Sheets

ELECTRONIC PRINTING APPARATUS WITH POWER SAVING MODE AND CONTROL METHOD THEREFOR

BACKGROUND OF THE INVENTION

The present invention relates to an electronic printing apparatus having a power saving mode, and in particular to an electronic printing apparatus that can not only reduce the power consumed by a print engine but can also reduce that consumed by a print controller.

The present application is based on Japanese Patent Applications No. Hei. 11-67155 and 11-321734, which are incorporated herein by reference.

DESCRIPTION OF THE RELATED ART

An electronic printing apparatus, such as a page printer or an ink-jet printer, upon receiving a print interrupt from a host computer prints an image in accordance with image data received at the same time. The general arrangement of such an electronic printing apparatus comprises: a print controller, for controlling a printing sequence and for performing image processing for the printing; and a print engine, for printing an image on a printing medium in accordance with a drive signal corresponding to image data supplied by the print controller. The print engine of the page printer includes, for example: a drum, on which a latent image is formed using a laser beam; and a toner supply unit, for supplying charged toner to the drum. The print controller is an electronic circuit board on which are mounted a band memory, in which image data to be printed are stored; a program memory, in which a printing sequence program is stored; and an electronic circuit board having a CPU or the like, for executing the printing sequence.

If printing is not performed for an extended period of time, the conventional electronic printing apparatus disconnects the power source for the print engine, or halts the supply of power to one part in the print engine, and enters the power saving mode. Then, when a print interrupt occurs, recovery of the print engine from the power saving mode to the normal state is effected, and the print interrupt is processed.

However, to implement a power consumption reduction, a conventional electronic printing apparatus halts only the supply of power to a print engine in a power saving mode. Since a print controller, constituted by an electronic circuit board, is maintained in the normal operating state, so as to cope with an interrupt process, such as a printing request received while in the power saving mode, the power consumed by the print controller is the same as is required in the normal operating state. Therefore, even when a conventional electronic printing apparatus is in the power saving mode, the power required by the print controller is not reduced, and a satisfactory power savings for the electronic printing apparatus can not be realized.

SUMMARY OF THE INVENTION

It is, therefore, one object of the present invention to provide an electronic printing apparatus that can save more power than can the conventional art.

It is another object of the present invention to provide an electronic printing apparatus that can save on the power required by a print controller while controlling the printing sequence of a print engine.

To achieve the above objectives, an electronic printing apparatus according to the present invention provides, for a print controller, a normal operating mode and a power saving mode for which less power is required. More preferably, when the print controller is set to the power saving mode, an interface circuit for accepting a printing interrupt is maintained in the normal state, and a CPU for controlling the printing sequence enters a power saving state. Then, in the power saving mode, the print controller can achieve a constant savings of power, while still retaining the capacity to appropriately accept an interrupt, such as a print interrupt.

To achieve the above objectives, according to one aspect of the present invention, an electronic printing apparatus which receives and prints image data comprises:

a print controller, for receiving the image data and controlling a printing sequence, having an image memory in which image data are temporarily stored; and a print engine, for printing an image on a predetermined printing medium in accordance with a drive signal corresponding to the image data supplied by the print controller, wherein the print controller includes a normal operating mode and a power saving mode that requires a smaller expenditure of power than does the normal operating mode.

Further, to achieve the above objectives, according to another aspect of the present invention, an electronic printing apparatus which receives and prints image data comprises:

a print controller, for receiving the image data and for controlling a printing sequence; and a print engine, for printing an image on a predetermined printing medium in accordance with a drive signal corresponding to the image data supplied by the print controller, wherein the print controller includes an interface circuit for receiving the image data and a CPU for executing a program for the printing sequence, and wherein the print controller has a power saving mode in which the interface circuit is maintained in the normal operating state while the CPU enters the power saving state.

Features and advantages of the invention will be evident from the following detailed description of the preferred embodiments described in conjunction with the attached drawings.

DETAILED DESCRIPTION OF THE PREFERRED EMBODIMENTS

One embodiment of the present invention will now be described. It should be noted, however, that the technical scope of the present invention is not limited to this embodiment.

Figure 1:
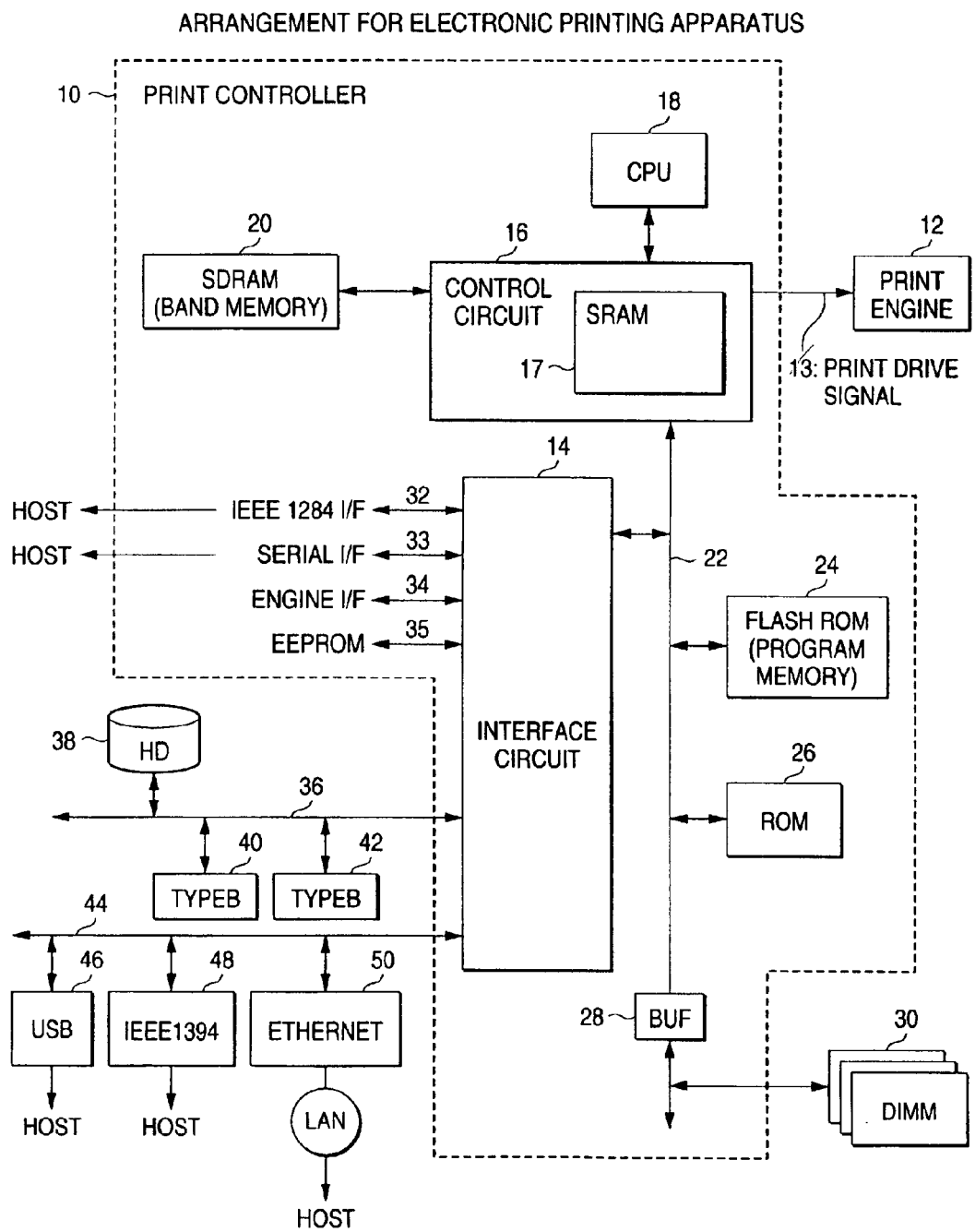
FIG. 1 shows a diagram showing the arrangement of an electronic printing apparatus according to one embodiment of the present invention.

FIG. 1 is a diagram showing the arrangement of an electronic printing apparatus according to the embodiment of the present invention. The electronic printing apparatus in FIG. 1 comprises: a print controller 10, which is connected to a host computer (not shown), and which accepts a print interrupt and receives print image data; and a print engine 12, for printing an image in accordance with data received from the print controller 10. In the print engine 12, a laser and a drum on which a latent image is formed using a laser beam are provided.

The print controller 10 includes: an interface circuit 14, which is connected to the host computer (not shown); a CPU 18, which executes a printing sequence program; a band memory 20, constituted by a SDRAM, in which image data to be printed are stored; and a control circuit 16, which is connected to the CPU 18, the band memory 20 and the interface circuit 14, and which manages the CPU 18, the band memory 20 and a bus 22. As the CPU 18 executes the printing sequence program, the control circuit 16 performs predetermined image processing, and transmits, to the print engine 12, a print drive signal 13 that corresponds to print image data.

The control program 16 is connected via the bus 22 to a program memory 24, which comprises a non-volatile memory, such as a flash ROM (flash memory), and in which a printing sequence program is stored; a ROM 26, which is constituted by a mask ROM and in which an IPL (Initial Program Loader) program is stored for the loading of another program; and the interface circuit 14. The bus 22 is connected via a buffer 28 to an optional extended memory 30.

In addition to the printing sequence program, in the program memory 24 are stored a program for appropriately processing image data, an interface control program for processing an interrupt command accepted by the interface circuit 14, a print engine program for controlling the print engine 12, and a recovery program for recovering to the normal operating mode from the power saving mode. These programs are transmitted via the control circuit 16 to the CPU 18, and are executed thereby.

The interface circuit 14 is constituted by, for example, ASIC (Application Specific Integrated Circuit), and includes an IEEE1284 port 32 and a serial port 33 connected to the host computer, a port 34 connected to the print engine 12, and a port 35 connected to an external non-volatile memory (EEPROM). The interface circuit 14 is connected via a bus 36 to a hard disk 38 and interface boards 40 and 42. Further, the interface circuit 14 is connected via a bus 44 to a USB port 46, an IEEE1394 port 48 and an Ethernet port 50, and is also connected via these ports to the host computer.

The SDRAM 20 constituting the band memory includes a band memory area in which compressed image data to be printed are stored; a program area in which a part of the various programs to be executed by the CPU 18 is temporarily stored; and a data area in which data required to execute these programs are stored temporarily.

The control circuit 16 is constituted by, for example, an ASIC (Application Specific Integrated Circuit), and performs predetermined image processing, compresses image data to be printed, decompresses compressed image data stored in the band memory 20, or performs color conversion or color compensation for decompressed image data. The control circuit 16 includes a random access memory (image memory) 17, which is an SRAM in which decompressed image data are stored temporarily. The control circuit 16, for example, decompresses RGB image data stored in the band memory 20, stores the obtained image data in the image memory 17, performs color conversion for the RGB image data to obtain CMYK image data, performs halftone processing for the obtained CMYK image data, and supplies a print drive signal 13 to the print engine 12.

The print controller 10 has a normal operating mode and a power saving mode. In the power saving mode, the interface circuit 14 and the control circuit 16 are maintained in the normal operating state, and the CPU 18, the band memory 20, the program memory 24 and the ROM 26 enter their individual power saving states. The power saving states of these components can be those wherein the supply of power is halted, or wherein power consumption is reduced. The band memory 20 constituted by the SDRAM enters, for example, a power down mode, the program memory 24 constituted by the flash ROM enters a sleeve mode, and the CPU 18 enters a predetermined power saving state.

Even in the power saving mode, the print controller 10 is maintained in the normal operating state, so that it can cope with a print interrupt received from the host computer or an interrupt received from an external power switch. Further, during a short period of time immediately following the occurrence of an interrupt, the interface control program and the recovery program for recovering the normal mode from the power saving mode are stored in the memory 17 of the control circuit 16, so that the interrupt can be appropriately handled. When the interrupt occurs, to enable the appropriate processing, these programs stored in the memory 17 are executed by the CPU 18, for which recovery from the sleep mode to the normal mode has been effected.

As is described above, since the print controller 10 does not execute the printing sequence in the power saving mode, hardware resources required for the printing sequence are changed to a mode in which the consumption of power is reduced as much as possible. It should be noted, however, that programs for processing an interrupt that occurs in the power saving mode and for recovering to the normal mode are read from the program memory 24 and stored in the image memory 17 of the control circuit 16, and that during a period immediately before the program memory 24 is recovered, the programs in the memory 17 are temporarily executed by the CPU 18. Further, the interface circuit 14 is maintained in the normal operating state in order to accept the first interrupt. The control circuit 16 is also maintained in the normal operating state.

A voltage of 5 V or 3.3 V may be supplied to the print engine 12 by a power source (not shown) that is provided, or may be furnished by the print controller 10.

Figure 2:
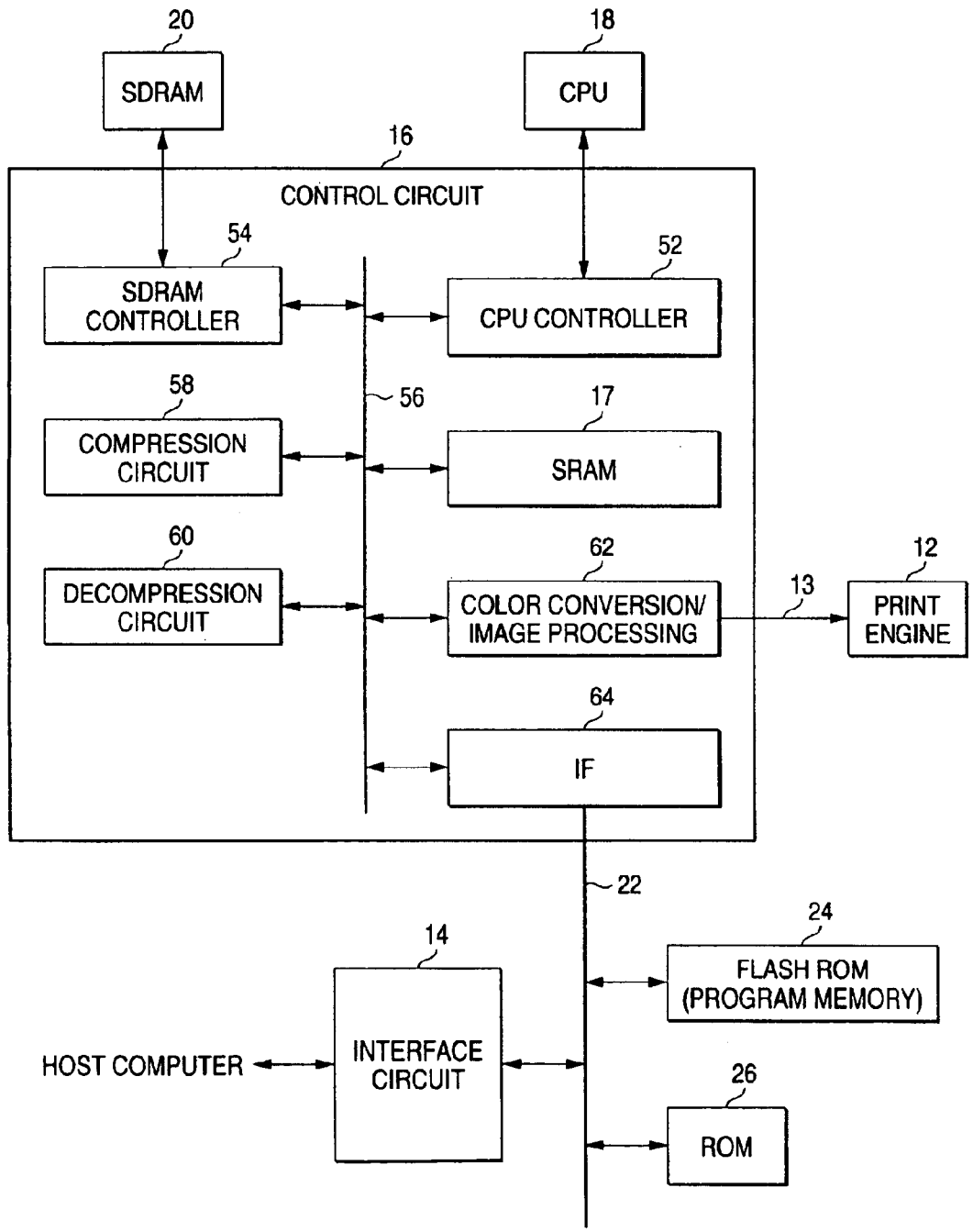
FIG. 2 shows a detailed diagram showing the arrangement of the present invention.

FIG. 2 is a detailed diagram showing the arrangement of the control circuit 16. The control circuit 16 includes: an SDRAM controller 54, for controlling the SDRAM 20 that constitutes the band memory; a CPU controller 52, for controlling the CPU 18; and an interface 64, which is connected to the bus 22. The control circuit 16 further includes: a compression circuit 58, a decompression circuit 60, and a circuit 62 for performing image processing, such as color conversion and halftone processing. These components are interconnected by, for example, a bus 56. The image processing circuit 62 transmits the drive signal 13 via a pulse width modulation circuit (not shown) to the print engine 12 to drive the laser in the print engine 12.

In the normal operating mode, the control circuit 16 exchanges data with the interface circuit 14 and the program memory 24 that are connected by the bus 22 to the CPU 18 and the band memory 20. For example, one part of the program in the program memory 24 is stored in the SDRAM 20, and is read and executed by the CPU 18. In response to the receipt of a print interrupt accepted by the interface circuit 14, the control circuit 16 notifies the CPU 18 of the occurrence of the print interrupt, and permits the CPU 18 to execute the printing sequence program.

Upon receiving the print interrupt, the control circuit 16 permits the compression circuit 58 to compress the image data, and stores the compressed image data in the SDRAM 20. At a timing synchronization with the operating timing of the print engine 12, the control circuit 16 reads the compressed image data from the SDRAM 20, permits the decompression circuit 60 to decompress the image data, and temporarily stores the obtained image data in the memory 17. The image data are then transmitted to the image processing circuit 62 and the print drive signal 13 is output. In addition to the image data, table data required for color conversion or halftone processing are stored in the memory 17, and are referred to by the image processing circuit 62. In this manner, the memory 17 is employed to execute printing.

Figure 3:
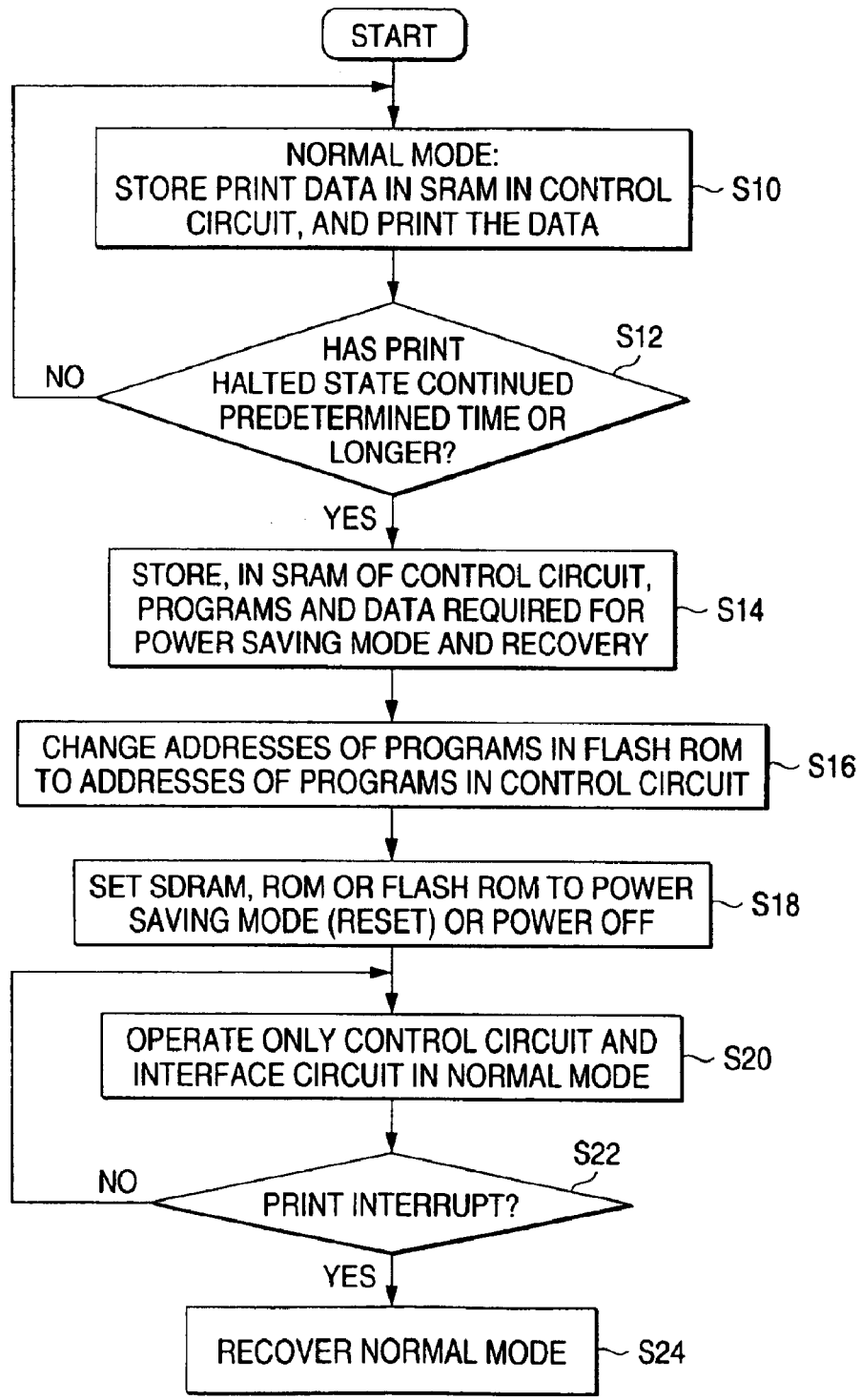
FIG. 3 shows a flowchart showing the processing for shifting the normal operating mode to the power saving mode according to the embodiment.

FIG. 3 is a flowchart showing the processing for shifting the normal operating mode to the power saving mode according to this embodiment. As is described above, in the normal operating mode the print image data are stored in the memory 17, which is an SRAM in the control circuit 16, and printing is initiated (S10). When, for example, a printing halt state lasts a predetermined period of time or longer, the normal operating mode is shifted to the power saving mode (S12).

To shift to the power saving mode, the interface control program required in the power saving mode and the recovery program required for recovery are loaded from the program memory 24 to the memory 17. The register data in the CPU 18 are also stored in the memory 17 (S14).

The addresses of the interface control program and the recovery program in the program memory 24 are changed to addresses in the memory 17 in the control circuit 16, so that the interface control program and the recovery program in the memory 17 can be executed (S16). Specifically, a change in the addresses of the programs that are returned to the interface 64 is designated.

The SDRAM 20 that is the band memory is shifted to the power down mode by the SDRAM controller 54, the supply of power to the ROM 26 is halted, and the program memory 24 is reset to the sleeve mode (S18). The CPU 18 thereafter enters the power saving mode. As a result, power is supplied only to the interface circuit 14 and the control circuit 16, which are maintained in the normal operating state (S20). It should be noted that in the power saving mode, the print engine 12 is set to the power saving mode as it is in the conventinoal art.

In the power saving mode, the interface circuit 14 and the control circuit 16 in the print controller 10 are operated in the normal operating mode. All the other devices in the print controller 10 are shifted to the power saving state, and the total power that is consumed can be reduced.

When the interface circuit 14 in the normal operating state receives a print interrupt from the host computer or an interrupt from an external switch (S22), the print controller 10 recovers with the print engine 12 to the normal operating mode (S24).

Figure 4:
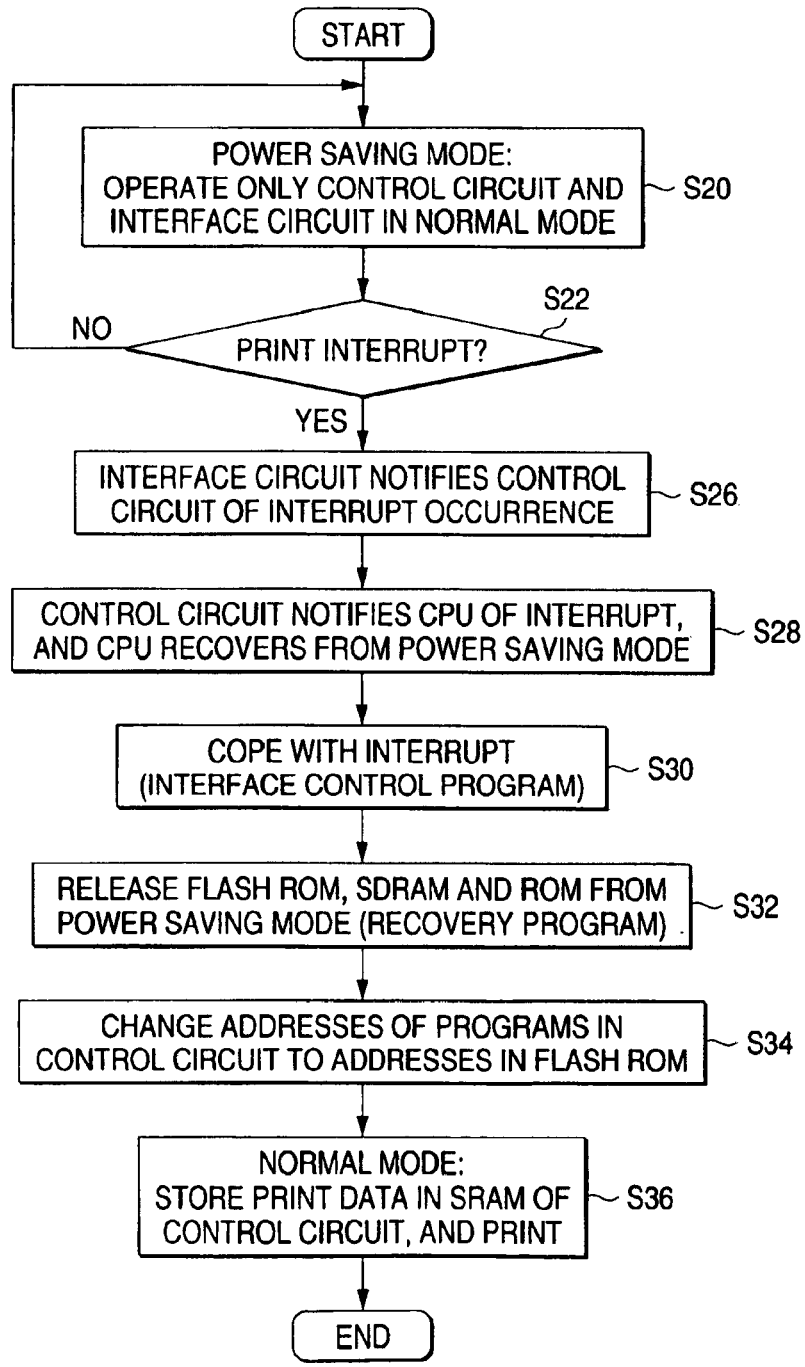
FIG. 4 shows a flowchart showing the processing for recovering to the normal operating mode from the power saving mode according to the embodiment.

FIG. 4 is a flowchart showing the processing for recovering to the normal operating mode from the power saving mode according to this embodiment. Steps S20 and S22 are the same as those in FIG. 3. When an interrupt occurs and is received from a host computer (not shown), first, the interface circuit 14 in the normal operating state accepts the interrupt and notifies the control circuit 16 of the occurrence of the interrupt (S26). Upon receipt of this notification, the control circuit 16, which is in the normal operating mode, notifies the CPU 18 of the occurrence of the interrupt, and the CPU 18 recovers from the power saving mode to the normal operating mode (S28). Upon this recovery, the CPU 18 records, in the original register, the data read from the memory 17 of the control circuit 16, and returns to the normal operating state.

In order to handle the print interrupt that has occurred, the CPU 18 executes the interface control program stored in the memory 17 of the control circuit 16, and, for example, transmits a reply for the interrupt command or temporarily instructs the host computer to wait for the transmission of print job data (S30). Thus, the appropriate process for the interrupt can be performed while the other devices in the power saving mode are recovering to the normal operating state.

The CPU 18 executes the recovery program stored in the memory 17 of the control circuit 16, releases, from the power saving mode, the program memory 24, which is a flash ROM, the band memory 20, which is a SDRAM, and the ROM 26, and effects the recovery of these components to the normal operating mode (S32). The interface 64 changes the addresses of the interface control program and the recovery program, which are stored in the memory 17 of the control circuit 16, from the addresses in the memory 17 to the addresses in the program memory 24 (S34). As a result, recovery of the print controller 10 to the normal operating mode (S36) is effected.

Upon receipt of not only the print interrupt from the host computer, but also of the interrupt from the external switch, the print controller 10 may be recovered from the power saving mode to the normal operating mode.

As is described above, according to the present invention, when an electronic printing apparatus that includes a print engine and a print controller is switched to a power saving mode, both the print engine and the print controller enter the power saving mode. It should be noted, however, that the interface circuit and the control circuit of the print controller are maintained in the normal operating state in order that they can cope with a print interrupt and can recover to the normal operating mode, and that the required programs and data are temporarily stored in the memory of the control circuit in which print image data are stored.

What is claimed is:

1. An electronic printing apparatus which receives and prints image data, comprising:
  a print controller for receiving said image data and controlling a printing sequence, said print controller including an image-processing dedicated control circuit having an image memory for temporarily storing said image data; and
  a print engine for printing an image on a predetermined printing medium in accordance with a drive signal corresponding to said image data supplied by said print controller;
  wherein said print controller includes a normal operating mode and a power saving mode in which less power is required that required in said normal operating mode; and
  wherein, in said normal operating mode, said print controller temporarily stores said image data in said image memory, and wherein in said power saving mode, said print controller stores in said image memory a recovery program to be used to return to said normal operating mode.

2. An electronic printing apparatus according to claim 1, wherein said print controller further includes:
   a CPU for executing a required program;
   an interface circuit for receiving said image data and an interrupt;
   a program memory in which sequence program for controlling said printing sequence and said recovery program are stored; and
   a band memory in which image data to be printed are stored;
   wherein said image-processing dedicated control circuit is connected to said CPU, said interface circuit, and said program memory and said image memory,
   wherein said normal operating mode is shifted to said power saving mode, said recovery program in said program memory is loaded to said image memory within said control circuit, and
   wherein, in said power saving mode, said control circuit and said interface circuit are maintained in the normal operating state, while the remainder of electronic parts are shifted to the power saving state.

3. An electronic printing apparatus according to claim 1, wherein an interface control program for controlling said interface circuit is stored in said program memory, wherein, when said normal operating mode is shifted to said power saving mode, said interface circuit is stored in said image memory, and wherein, in said power saving mode, said interface control program is executed in response to said interrupt received by said interface circuit.

4. An electronic printing apparatus according to claim 1, wherein, when recovery to said normal operating mode of said electronic parts in said power saving mode is effected, part or all of said electronic parts, including said program memory and said band memory in said power saving state, are returned to the normal state by executing said control program.

5. The electric printing apparatus according to claim 1, wherein the control circuit is an application specific integrated circuit, and the memory is SRAM.

6. An electronic printing apparatus which receives and prints image data comprising:
   a print controller for receiving said image data and for controlling a printing sequence; and
   a print engine for printing an image on a predetermined printing medium in accordance with a drive signal that corresponds to said image data supplied by said print controller,
   wherein said print controller comprises:
      an image-processing dedicated control circuit having an image memory for temporarily storing said image data;
      an interface circuit for receiving said image data; and
      a CPU for executing a program for said printing sequence, and
   wherein said print controller has a power saving mode during which said interface circuit and said control circuit are maintained in a normal operating state, while said CPU enters a power saving state.

7. The electric printing apparatus according to claim 6, wherein the control circuit is an application specific integrated circuit, and the memory is SRAM.

8. The electric printing apparatus according to claim 6, wherein the print controller includes an band memory in which the image data are stored, and
   wherein in the power saving mode, the band memory enters the power saving state.

9. A method for controlling an electronic printing apparatus comprising steps of:
   permitting a CPU, when a normal operating mode is shifted to a power saving mode, to load a recovery program stored in a program memory into an image memory within an image-processing dedicated control circuit; and
   maintaining the control circuit and an interface circuit in a normal operating state, while part or all of the remainder of electronic parts enter a power saving state.

10. A method for controlling an electronic printing apparatus comprising steps of:
   effecting a recovery of a CPU from a power saving state when shifting from a power saving mode to a normal operating mode following receipt of an interrupt originating at an interface circuit and an image-processing dedicated control circuit;
   permitting said recovered CPU to execute a recovery program stored in an image memory within said control circuit; and
   shifting all or part of electronic parts that are in the power saving mode to a normal operating state by execution of said recovery program.

11. A method for controlling an electronic printing apparatus comprising steps of:
   permitting a CPU to load a recovery program stored in a program memory into an image memory within an image-processing dedicated control circuit;
   maintaining said control circuit and an interface circuit in a normal operating state, while part or all of the remainder of electronic parts enters a power saving state;
   effecting a recovery of a CPU from the power saving state when a power saving mode is shifted to a normal operating mode upon receipt of an interrupt originating at said interface circuit and said control circuit;
   permitting said recovered CPU, to execute said recovery program stored in said image memory; and
   shifting part or all of electronic parts that are in the power saving mode to the normal operating state by execution of said recovery program.

* * * * *